Dec. 18, 1934. F. C. MOCK Re. 19,400

TRANSMISSION

Original Filed March 30, 1932

INVENTOR.
Frank C. Mock
BY
Warren P. Hunt
ATTORNEY.

Reissued Dec. 18, 1934 Re. 19,400

UNITED STATES PATENT OFFICE 19,400

TRANSMISSION

Frank C. Mock, Montclair, N. J., assignor, by mesne assignments, to Eclipse Aviation Corporation, East Orange, N. J., a corporation of New Jersey Original No. 1,920,579, dated August 1, 1933, Serial No. 602,038, March 30, 1932. Application for reissue November 27, 1933, Serial No. 699,994

29 Claims. (Cl. 74—336)

This invention relates to power transmission mechanisms, and more particularly to automatic variable speed power transmission mechanisms.

Transmission mechanisms of the automatic variable speed type are very desirable in automobile use and have been used heretofore with various degrees of success. The gear changes in automatic transmissions are usually responsive to torque or speed or a combination of both, but in automobile use it is desirable at times to depart from torque or speed control and remain in the high gear during the time the engine is operating at less than its full power.

It is obvious that if the vehicle operator is driving with closed throttle he is not taking advantage of the full power of the engine and that, therefore, it is unnecessary to use a lower gear ratio, for if more torque is desired, it can be obtained by opening the throttle instead of changing to a lower gear ratio. The vehicle is preferably operated in high gear under all conditions where the engine is capable of propelling the vehicle in that gear, and speed or gear changes are not necessary or desirable until the torque load becomes greater than the torque delivered by the engine at wide open throttle. In the present invention, the engine suction is used to increase the capacity of a high gear clutch at closed throttle positions whereby the clutch capacity is increased and the tendency toward gear changes is retarded at closed or partially closed throttle positions.

An important object of the invention is to provide a suction control of a speed or torque responsive automatic transmission mechanism.

Another object of the invention is to increase the tendency of the transmission mechanism to remain in high gear when the engine throttle is closed.

Another object of the invention is to provide an automatic transmission with a friction clutch that is controlled by load, the effect of which is in turn controlled by engine suction.

Another object of the invention is to provide a transmission with a friction clutch that is responsive to the driven shaft speed which, in turn, is controlled by engine manifold suction.

Another object of the invention is to provide a transmission that is responsive to load, speed and engine suction, any one of which is effective to control the point at which gear changes are automatically made.

Other objects and features of the invention will be apparent from the following description, in connection with which a preferred embodiment of the invention has been illustrated in the accompanying drawing, in which.

Figures 1, 2, 3:
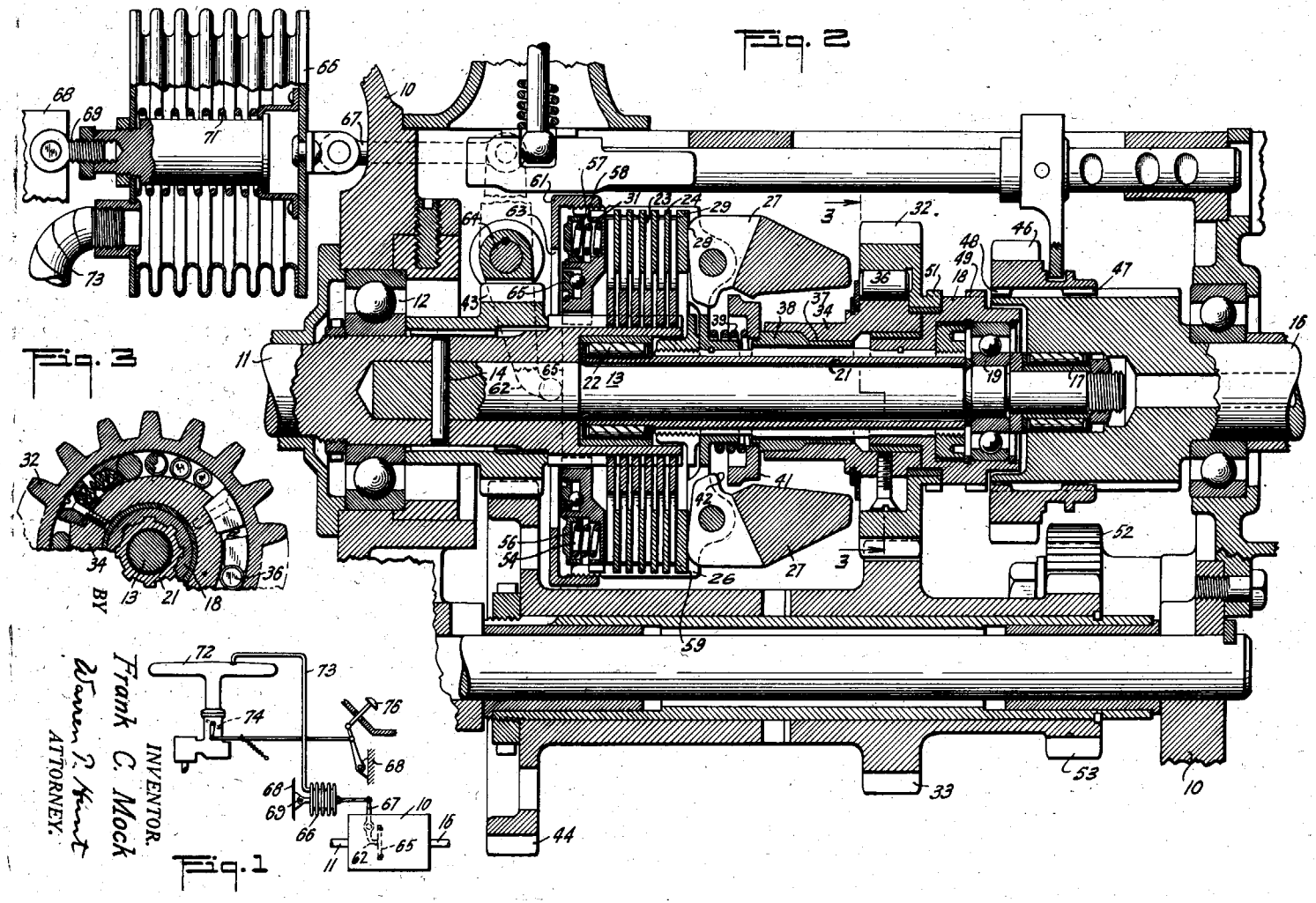
Fig. 1 is a diagrammatic view illustrating the manner in which the automatic transmission is controlled by the engine suction.
Fig. 2 is a longitudinal sectional view of the improved transmission.
Fig. 3 is a sectional view taken in the direction of the arrows 3—3 of Fig. 2, illustrating the overrunning clutch used in the second speed gear.

In the drawing, 10 is the transmission housing within which is rotatably mounted a driving shaft 11 and which is supported therein by bearing 12. Driving shaft 11 is provided with an extension 13 drivably connected thereto by pin 14 and is supported in driven shaft 16 by bearing 17. Extension 13 is rotatable within a coupler 18 by means of bearing 19, and the coupler 18 has a splined connection with sleeve 21 that is rotatably mounted on the driving shaft 11 by bearing 22. A friction clutch comprising a series of driving plates 23 secured to the driven shaft and a similar set of driving plates 24 secured to the housing 26 is mounted upon the rear end of driving shaft 11, whereby the clutch housing 26 may be operatively connected to the driving shaft 11 upon outward movement of weights 27, the noses 28 of which are adapted to engage pressure plate 29 and force the clutch plates against the resilient backing plate 31 to directly connect the driving shaft 11 with the clutch housing that is secured to the driven sleeve 21.

Second speed gear 32, which has its teeth normally meshing with countershaft gear 33, is connected with an associated member 34 by means of an overrunning roller clutch having rollers 36 which are wedged into engagement with hub 34, as illustrated in Fig. 3. The operation of the overrunning clutch is well known in the art and need not be further described, except to say that hub 34 may freely rotate in a clockwise direction with respect to the gear 32 but may be driven thereby in the same direction when gear 32 becomes the driving member. Hub 34 is provided with a coarsely threaded portion 37 having threaded engagement with a nut 38 slidably splined to the driven sleeve 21, and nut 38 is adapted to be moved toward the left, as viewed in Fig. 2, upon an increase of the driven shaft load. Movement of nut 38 toward the left at some predetermined load overcomes the spring 39 and forces collar 41 against portion 42 of weights 27 and urges them to their inner position, whereby the pressure on the clutch plates is relieved and the clutch disengaged. Upon clutch disengagement, the drive is assumed by the gear 32 and the driving force is transmitted through gears 43, 44, 33 and 32 and through the overrunning clutch to hub 34 and nut 38, the latter, as before stated, being splined to the driven sleeve 21. A slidable gear 46 is mounted upon driven shaft 16 by splines 47, which is adapted to assume four positions, the neutral position being shown in Fig. 2 whereby there is no connection between the driven sleeve 21 and the driven shaft 16. Movement of gear 46 toward the left causes teeth 48 to engage teeth 49 of the coupler 18, whereby rotation of driving sleeve 21 may be transmitted to the driven shaft 16, and further movement of gear 46 toward the left causes teeth 48 to mesh with teeth 51 of the second speed gear 32 and enable the operator to directly connect driven shaft 16 to the driving shaft 11 around the overrunning clutch and permit the engine to be used as a brake in descending steep grades.

Movement of gear 46 toward the right causes its teeth to engage with idler gear 52 which is in constant mesh with countershaft gear 53 and enables driven shaft 16 to be turned in the opposite direction for reversing the movement of the vehicle, upon which the transmission is intended to be used.

Resilient backing plate 31 is preferably formed in two portions normally urged apart by a plurality of springs 54 coacting between the spring holding member 56 and the main portion of the plate 31 for urging the latter in the direction of the weights 27, the main portion of the plate being movable with respect to the member 56 until the opposed edges 57 and 58 abut and limit the resilient movement. Clutch plates 23 and 24, as well as backing plate 31, are movable as a whole within the clutch housing 26; movement toward the right being restricted by the shoulder 59 and movement toward the left being restricted by adjustable cap member 61.

A yoke lever 62 normally contacts the thrust bearing 65 of the backing plate through an opening 63 in the cap member, which lever is pivotally mounted on the transmission housing 10 at 64 and has its upper end connected to a resilient bellows 66 by a link 67. Bellows 66 is preferably pivotally supported at one end on a fixed part of the vehicle, such as frame 68, and is adapted to be adjustable with respect thereto by a threaded member 69, the bellows being normally extended by a spring 71 and having its interior connected with the engine manifold 72 by a conduit 73, which is preferably connected to the manifold at a point above the throttle 74 which is normally controlled by the accelerator pedal 76, the arrangement being such that when bellows 66 is collapsed by suction from the engine an increased pressure is placed upon the pressure plate 31 to urge it toward the weights 27.

In the operation of the vehicle, assuming that it is desired to move in a forward direction, gear 46 is moved from its neutral position, as shown in Fig. 2, toward the left until teeth 48 and teeth 49 are in mesh. In this position of the transmission, assuming that the vehicle is stationary and is being started from a position of rest, power will be transmitted through gears 43, 44, 33 and 32, which will move nut 38 toward the left and disengage the clutch, whereupon the vehicle will be moved in a forward direction in second gear. As soon as the vehicle attains the desired speed or the load on the driven shaft is reduced, weights 27 will move outwardly by centrifugal force, the nut 38 will be forced to the right by shoulders 42 and the plates 23 and 24 will be forced together by the nose 28, whereupon the drive will be taken directly from the driving shaft 11 to the housing 26 which is secured to the driven sleeve 21. The collar 41 is limited in its movement toward the right by hub 34 and therefore acts as a stop to limit the maximum outward movement of weights 27. As gear 32 will then be driven at a slower speed than its hub 34, the overrunning clutch will come into action and the shaft 16 will be rotated at engine shaft speed. If the load upon the driven shaft should increase beyond a predetermined point, the nut 38 will be again moved toward the left to throw out the clutch and permit the second speed gear to take up the drive.

The operation above described is known to those skilled in the art, but it will be noted that in the present application the backing plate 31 is movable in accord with engine suction and that as the suction increases, the pressure on the clutch plates is increased.

Under certain conditions with closed throttle and low clutch speeds the entire clutch will be moved toward the right until the pressure plate 29 coacts with the clutch housing 26 and the plates will be pressed into engagement by suction within the intake manifold. With this arrangement of the parts, under high suction conditions the capacity of the clutch is increased beyond that which it would have if it were effected only by speed and torque, and there will be less tendency for the transmission to shift into the second gear position. Under wide open throttle conditions, the same force produced by torque and speed will overcome the force applied by manifold suction and move the clutch pack toward the left, until the member 56 of the backing plate contacts with adjustable cap 61, and under these conditions the speed changes will be responsive to torque and speed only and will not be affected by minor changes in the manifold suction. If desired, the vacuum controlled lever 62 may be arranged to act on the pressure plates 23—24 instead of the backing plate 31, but the actuation through the backing plate is thought to be the better arrangement.

While a preferred embodiment of the invention has been illustrated and described, it is understood that this showing and description are illustrative only and that the invention is not regarded as limited to the form shown and described, or otherwise, except by the terms of the following claims:

What is claimed is:

1. In a device of the character described, a driving shaft, a driven shaft, a clutch for connecting the shafts, vacuum means for controlling the clutch, speed responsive means for controlling the clutch, torque responsive means for controlling the clutch, and means for connecting the shafts around the clutch upon disengagement thereof.

2. In a device of the character described, a driving shaft, a driven shaft, a clutch for connecting the shafts, vacuum means for controlling the clutch, torque responsive means for controlling the clutch, and means for connecting the shafts around the clutch upon disengagement thereof.

3. In a device of the character described, a driving shaft, a driven shaft, a clutch for connecting the shafts, vacuum means for controlling the clutch, speed responsive means for controlling the clutch, and means for connecting the shafts around the clutch upon disengagement thereof.

4. In a device of the character described, a driving shaft, a driven shaft, a clutch for connecting the shafts, vacuum means for controlling the clutch, speed responsive means for controlling the clutch, torque responsive means for controlling the clutch, and gear means including an overrunning clutch for connecting the shafts around the clutch.

5. In a device of the character described, an intake manifold and a throttle therefor, a driving shaft, a driven shaft, means for directly connecting the shafts, gear means for indirectly connecting the shafts, said direct connecting means including a friction clutch, load responsive means for controlling the clutch, and manifold vacuum actuated means for controlling the clutch.

6. In a device of the character described, an intake manifold and a throttle therefor, a driving shaft, a driven shaft, means for directly connecting the shafts, gear means for indirectly connecting the shafts, said direct connecting means including a friction clutch, load and speed responsive means for controlling the clutch, and vacuum actuated means for controlling the clutch.

7. In a device of the character described, an intake manifold and a throttle therefor, a driving shaft, a driven shaft, means for directly connecting the shafts, gear means for indirectly connecting the shafts, said direct connecting means including a friction clutch, load responsive means for controlling the clutch, a movable backing plate for the clutch, and manifold vacuum actuated means for moving the backing plate.

8. In a device of the character described, an intake manifold and a throttle therefor, a driving shaft, a driven shaft, means for directly connecting the shafts, gear means for indirectly connecting the shafts, said direct connecting means including a friction clutch, load responsive means for controlling the clutch, a movable backing plate for the clutch, and vacuum actuated means arranged to move the backing plate toward the clutch when the manifold suction is increased.

9. In a device of the character described, an engine manifold and a throttle therefor, a driving shaft, a driven shaft, a friction clutch for connecting the shafts, centrifugal means for engaging the clutch, means for connecting the shafts around the clutch upon disengagement thereof, and vacuum means operated by the suction above the throttle for assisting the action of the centrifugal means.

10. In a device of the character described, an engine manifold and a throttle therefor, a driving shaft, a driven shaft, a friction clutch for connecting the shafts, centrifugal means for engaging the clutch, means for connecting the shafts around the clutch upon disengagement thereof, and vacuum actuated means for engaging the clutch when the manifold suction above the throttle is increased, to a predetermined point.

11. In a device of the character described, an engine manifold and a throttle therefor, a driving shaft, a driven shaft, a friction clutch for connecting the shafts, centrifugal means for engaging the clutch, means for connecting the shafts around the clutch upon disengagement thereof, a movable backing plate for the clutch, and means actuated by the manifold suction above the throttle for moving the backing plate.

12. In a device of the character described, an engine manifold and a throttle therefor, a driving shaft, a driven shaft, a friction clutch for connecting the shafts, centrifugal means for engaging the clutch, means for connecting the shafts around the clutch upon disengagement thereof, a movable backing plate for the clutch, and means actuated by the manifold suction above the throttle, arranged to move the backing plate toward the clutch when the suction is increased.

13. In a device of the character described, an engine intake manifold and a throttle therefor, a driving member, a driven member, a friction clutch for connecting the shafts including axially movable plates operatively connected to the driving and driven members respectively, said clutch being engaged on one side by a member movable by manifold vacuum and on the other side by a speed responsive member, means for connecting the driving and driven members around the clutch, and means for limiting the axial movement of the plates in either direction.

14. In a device of the character described, an engine intake manifold and a throttle therefor, a driving member, a driven member, a friction clutch for connecting the shafts including axially movable plates operatively connected to the driving and driven members respectively, said clutch being engaged on one side by a member movable by manifold vacuum and on the other side by a speed responsive member, means for connecting the driving and driven members around the clutch, means for limiting the axial movement of the plates in either direction, and said vacuum actuated member being adapted to move the clutch into greater frictional contact when the suction is increased.

15. In a device of the character described, an engine intake manifold and a throttle therefor, a driving member, a driven member, a friction clutch for connecting the shafts including axially movable plates operatively connected to the driving and driven members respectively, said clutch being engaged on one side by a member movable by manifold vacuum and on the other side by a speed responsive member, means for connecting the driving and driven members around the clutch, means for limiting the axial movement of the plates in either direction, and said vacuum actuated member being adapted to oppose movement of the plates by the speed responsive means and overcome the same under substantially closed throttle conditions, whereby the plates are frictionally clamped between the vacuum actuated member and the means limiting the axial movement of the plates.

16. In a device of the character described, an engine intake manifold and a throttle therefor, a driving member, a driven member, a friction clutch for connecting the shafts including axially movable plates operatively connected to the driving and driven members respectively, said clutch being engaged on one side by a member movable by manifold vacuum and on the other side by a speed responsive member, means for connecting the driving and driven members around the clutch, means for limiting the axial movement of the plates in either direction, and torque responsive means for controlling the effect of the speed responsive member.

17. In a device of the character described, an engine intake manifold and a throttle therefor, a driving member, a driven member, a friction clutch for connecting the shafts including axially movable plates operatively connected to the driving and driven members respectively, said clutch being engaged on one side by a member movable by manifold vacuum and on the other side by a speed responsive member, means for connecting the driving and driven members around the clutch, means for limiting the axial movement of the plates in either direction, and torque responsive means for decreasing the effect of the speed responsive member as the load on the driven member is increased.

18. In a device of the character described, an engine manifold having a throttle, a driving member, a driven member, a friction clutch for directly connecting the shafts including axially movable plates operatively connected to the driving and driven members respectively, said clutch plates being engaged on one side by a speed responsive member rotatable with the driven shaft and on the opposite side by a resilient backing plate, and a manifold vacuum actuated device arranged to resist movement of the backing plate.

19. In a device of the character described, an engine manifold having a throttle, a driving member, a driven member, a friction clutch for directly connecting the shafts including axially movable plates operatively connected to the driving and driven members respectively, said clutch being engaged on one side by a speed responsive member rotatable with the driven shaft and on the opposite side by a resilient backing plate, a vacuum actuated device arranged to resist movement of the backing plate, and torque responsive means for controlling the effect of the speed responsive means.

20. In a device of the character described, an engine manifold having a throttle, a driving member, a driven member, a friction clutch for directly connecting the shafts including axially movable plates operatively connected to the driving and driven members respectively, said clutch being engaged on one side by a speed responsive member rotatable with the driven shaft and on the opposite side by a resilient backing plate, a vacuum actuated device arranged to resist movement of the backing plate, and torque responsive means adapted to decrease the effect of the speed responsive means when the driven shaft load is increased.

21. In a device of the character described, an engine manifold having a throttle, a driving member, a driven member, a friction clutch for directly connecting the shafts including axially movable plates operatively connected to the driving and driven members respectively, said clutch being engaged on one side by a speed responsive member rotatable with the driven shaft and on the opposite side by a resilient backing plate, a stop for limiting movement of the plates toward the speed responsive member, and a vacuum actuated device arranged to resist movement of the backing plate in a manner to increase the pressure on the backing plate as the suction above the throttle is increased.

22. In a device of the character described, an engine manifold having a throttle, a driving shaft, a driven shaft, a bodily movable friction clutch for directly connecting and disconnecting the shafts, other means for connecting the shafts when the clutch is disengaged, speed actuated means for controlling the clutch, means for limiting clutch movement toward the speed actuated means, and vacuum actuated means in constant communication with the manifold above the throttle for engaging the clutch by clamping the same against the limiting means under conditions of high manifold suctions and low speeds of the speed actuated means.

23. In a transmission mechanism for a vehicle having an engine with an intake manifold, the combination of driving and driven shafts, a clutch having friction surfaces for connecting the shafts, speed responsive means rotatable with the clutch and arranged to force the surfaces into contact for increasing the torque capacity of the clutch at high speeds, and manifold pressure actuated means in constant communication with the manifold and operable on the clutch for increasing the clutch capacity at decreased manifold pressure.

24. In a transmission mechanism for a vehicle having an engine with a manifold, the combination of a driving shaft, a driven shaft, a friction clutch for connecting the shafts, centrifugal weights pivotally mounted on the clutch for increasing the clutch capacity as the speed is increased, a portion of said clutch being bodily movable to vary the effect of the weights, and manifold pressure operated means in constant communication with the manifold for controlling the bodily movement of the clutch in accordance with variations in manifold pressure.

25. In a transmission mechanism for a vehicle having an engine, the combination of a driving shaft, a driven shaft, a friction clutch for connecting the shafts, centrifugal weights pivotally mounted on the clutch for controlling the clutch to increase its capacity at high speeds, and means operated from the engine and in accordance with changes in engine pressures to increase the clutch capacity at low clutch speeds.

26. In a transmission mechanism for a vehicle having an engine, the combination of a driving shaft, a driven shaft, a friction clutch for connecting the shafts, centrifugal weights rotatable with the clutch for controlling the clutch to increase its capacity at high speeds, and means operated by and in accordance with variations in an internal pressure of the engine to increase the clutch capacity at low clutch speeds.

27. In a transmission mechanism for a vehicle having an engine with a manifold, a driving shaft, a driven shaft, a friction clutch for connecting the shafts, centrifugal weights rotatable with the clutch for controlling the clutch to increase the clutch capacity at high speeds, means including a movable member operable on the friction members of the clutch to increase the clutch capacity at low speeds, a device connected to the engine manifold and operated by manifold pressure, and a linkage operably connecting the device and the movable member, said linkage being arranged to move the clutch toward an engaged position by a manifold pressure less than atmospheric pressure.

28. In a transmission mechanism for a vehicle having an engine with a manifold and a speed controlling throttle therein whereby the manifold pressure is reduced at low engine speeds, a driving shaft, a driven shaft, gear means for connecting the shafts, a friction clutch for controlling the operation of the gear means, centrifugal weights pivotally mounted on the clutch for controlling the clutch, and manifold pressure controlled means operative on the clutch for augmenting the effect of the weights to increase the clutch capacity at low engine speeds.

29. In a transmission mechanism for a vehicle having an engine with a manifold, a driving shaft, a driven shaft, a friction clutch for connecting the shafts, speed responsive means rotated by the clutch for controlling the clutch, and means actuated by manifold pressure less than atmospheric pressure to increase the clutch capacity and augment the effect of the speed responsive means.

FRANK C. MOCK.